United States Patent
Kang

(10) Patent No.: US 7,127,429 B2
(45) Date of Patent: Oct. 24, 2006

(54) DIGITAL CONTENTS SUPERDISTRIBUTION SYSTEM AND METHOD OF DISTRIBUTING DIGITAL CONTENTS

(75) Inventor: Dong-seok Kang, Yongin (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 776 days.

(21) Appl. No.: 09/783,560

(22) Filed: Feb. 15, 2001

(65) Prior Publication Data
US 2001/0051925 A1 Dec. 13, 2001

(30) Foreign Application Priority Data
Apr. 26, 2000 (KR) ............................... 2000-22161

(51) Int. Cl.
*G06F 17/60* (2006.01)
(52) U.S. Cl. ............................... 705/54; 705/7; 705/50; 705/53; 705/67
(58) Field of Classification Search ................. 705/50, 705/54, 7, 53, 67
See application file for complete search history.

(56) References Cited

U.S. PATENT DOCUMENTS 6,418,421 B1 * 7/2002 Hurtado et al. ............... 705/54
2002/0194485 A1 * 12/2002 Ram et al. .................. 713/193
2003/0135464 A1 * 7/2003 Mourad et al. ............... 705/50
2004/0107125 A1 * 6/2004 Guheen et al. ................. 705/7

* cited by examiner

Primary Examiner—Firmin Backer
(74) Attorney, Agent, or Firm—Staas & Halsey LLP

(57) ABSTRACT

A digital contents superdistribution and transmittance method through the digital contents download services including accessing a server providing digital contents download services via a communication network to make payment for digital contents on the server, and receiving a download of the digital contents on which a security code is set; distributing the downloaded digital contents for which payment has been made to another user; executing the digital contents on the another user's computer, and accessing the server automatically via a communication network; and if the server is accessed and payment is made for the digital contents by the another user, offering a predetermined compensation to the user that has received the download. Accordingly, those who properly receive a download of digital contents can re-distribute the digital contents, and digital contents distribution can be promoted by offering a predetermined portion of profits resulting from the distribution. Furthermore, compatibility with the conventional distribution mechanism for encrypted digital contents can be achieved.

22 Claims, 2 Drawing Sheets

DIGITAL CONTENTS SUPERDISTRIBUTION SYSTEM AND METHOD OF DISTRIBUTING DIGITAL CONTENTS

CROSS-REFERENCE TO RELATED APPLICATIONS

This application claims the benefit of Korean Application No. 00-22161, filed Apr. 26, 2000, in the Korean Industrial Property Office, the disclosure of which is incorporated herein by reference.

BACKGROUND OF THE INVENTION

1. Field of the Invention

The present invention relates to digital contents download services, and more particularly, to a method of superdistribution of digital contents through download services.

2. Description of the Related Art

Unlike tangible products or goods (hereinafter referred to as "tangible goods"), digital contents, which are intangible electronic goods, can be replicated easily. In order to produce digital contents, as much capital, labor, and knowledge are required as required to produce tangible goods. However, digital contents are quite different from tangible goods in terms of distribution. For example, digital contents are composed of bits, which means they can be easily copied and distributed through computer systems and computer networks. Tangible goods have been distributed based on a traditional pay-per-copy mechanism. However, in the case of digital contents, it is very easy to copy and distribute digital contents without authority and without paying for the product. For this reason, various types of security measures (hereinafter referred to as "solutions") for preventing unauthorized copying and distribution of digital contents have been developed.

In particular, as the Internet, which is a global network connecting computers, has grown substantially in popularity following the development of a world wide web (WWW) system, distribution methods (download services, for example) of digital contents (i.e., software, music, video, images, documents, or any other item that can be distributed digitally) through the Internet are growing rapidly. Furthermore, since the WWW provides for an environment that enables users to easily access and navigate or explore the Internet, contents themselves have become increasingly important. Along with this, for protection of digital contents in an Internet environment, a movement for distribution of only contents to which security techniques are applied (encrypted by a predetermined method, for example) is expanding.

However, according to conventional encrypted contents distribution methods, such as those used in download services, those who legally receive a download of digital contents (i.e, those who pay for corresponding contents by a predetermined payment method hereinafter called "payers") are only allowed to use the downloaded contents, and they are prevented from distributing the copies to other persons. This is because a security solution is set on the corresponding contents so that only the payer can use it.

A conventional security paradigm prevents the unauthorized copying and distribution of digital contents. However, an Internet environment provides for a digital contents superdistribution scheme, which allows free copying and distribution of digital contents on the condition that a fee is paid for the use of the digital contents.

A currently proposed superdistribution (hereinafter referred to as "typical superdistribution") paradigm which requires payment for "use" of digital contents results in the building of a unique payment and security system which monitors the use of digital contents to require payment for the same. Thus, this superdistribution paradigm may reduce existing Internet sites, which are equipped with a security solution and a payment system and serve to distribute digital contents through download services, to a mere dummy distribution agent that distributes the digital contents without performing the security and payment functions. Furthermore, the typical superdistribution paradigm may reduce the digital contents distribution market since there is little distinction between Internet sites for distribution of digital contents under this paradigm. This may hinder distribution of digital contents.

SUMMARY OF THE INVENTION

To solve the above problems, it is an objective of the present invention to provide a digital contents superdistribution system and a method of distributing digital contents which allow a person who legally receives a download of digital contents to distribute the downloaded contents and to be offered a predetermined portion of profits resulting from distribution of the downloaded contents.

It is an additional objective of the present invention to promote the distribution of digital contents while achieving compatibility with a conventional digital contents distribution mechanism (security paradigm).

It is a still further objective of the present invention to overcome the possibility that conventional security solutions used to prevent unauthorized copying and distribution would hamper the distribution of digital contents in an Internet environment.

Additional objects and advantages of the invention will be set forth in part in the description which follows and, in part, will be obvious from the description, or may be learned by practice of the invention.

Accordingly, to achieve the above and other objectives, an embodiment of the present invention provides a digital contents superdistribution method through a method of providing digital contents download services comprising accessing a server providing digital contents download services via a communication network to make payment for digital contents on the server, and receiving a download of the digital contents on which a security code is set; distributing the downloaded digital contents after making the payment to another user; if the distributed digital contents are executed on another user's computer, accessing the server automatically via a communication network; and if the server is accessed and payment is made for the digital contents by the another user, offering of a predetermined compensation via the server to the user that has received the download.

In addition, if the digital contents are executed on the another user's computer, the server is further accessed due to a failure of a security check on a security code set on the digital contents.

In addition, if the digital contents are executed on the another user's computer, the server is accessed and payment is made for the digital contents by another user, further resetting the security code set on the digital contents for the another user who makes the payment.

The digital contents superdistribution method according to another aspect of the present invention, further comprising distributing the digital contents on which a security code is reset to a different user; and if payment for the digital contents transmitted is made by the different user, the server offering a predetermined compensation to the another user who has distributed the corresponding digital contents to the different user.

In addition, if payment for the digital contents distributed to the different user is made by the different user, the security code which has been set on the digital contents is reset for the different user who makes the payment. The resetting of the security code of distributed digital contents and the offering of compensation is repeated hierarchically.

According to another aspect of the present invention, a digital contents superdistribution method through digital contents download services comprises accessing from a first client a server, which provides digital contents download services, via a communication network and making payment for the downloaded digital contents, and downloading from the server the digital contents on which a security code is set; if the downloaded digital contents, which are distributed from the first client to a second client, are executed by the second client, receiving at the server an access request from the second client via a communication network; and if the second client makes payment for the digital contents, offering a predetermined compensation using the server to the first client who distributed the downloaded digital contents to the second client.

According to another aspect of the present invention, a digital contents superdistribution system comprises a server computer to provide digital contents download services; a first user computer which is connected to the server computer via a communication network, to make payment for digital contents, and to receive download services of the digital contents on which a security code is set from the server computer; and a second user computer which is connected to the server computer via a communication network and is automatically connected to the server computer if the digital contents distributed from the first user computer are executed. If the digital contents distributed from the first user computer are executed on the second user computer, the second user computer accesses the server computer due to a failure of a security check on a security code set on the digital contents. Furthermore, if the second user computer accesses the server to make payment for the digital contents, a predetermined compensation is offered to the user of the first user computer who has distributed the digital contents.

BRIEF DESCRIPTION OF THE DRAWINGS

The above objectives and advantages of the present invention will become more apparent by describing in detail a preferred embodiment thereof with reference to the attached drawings in which.

DESCRIPTION OF THE PREFERRED EMBODIMENTS

Figure 1:
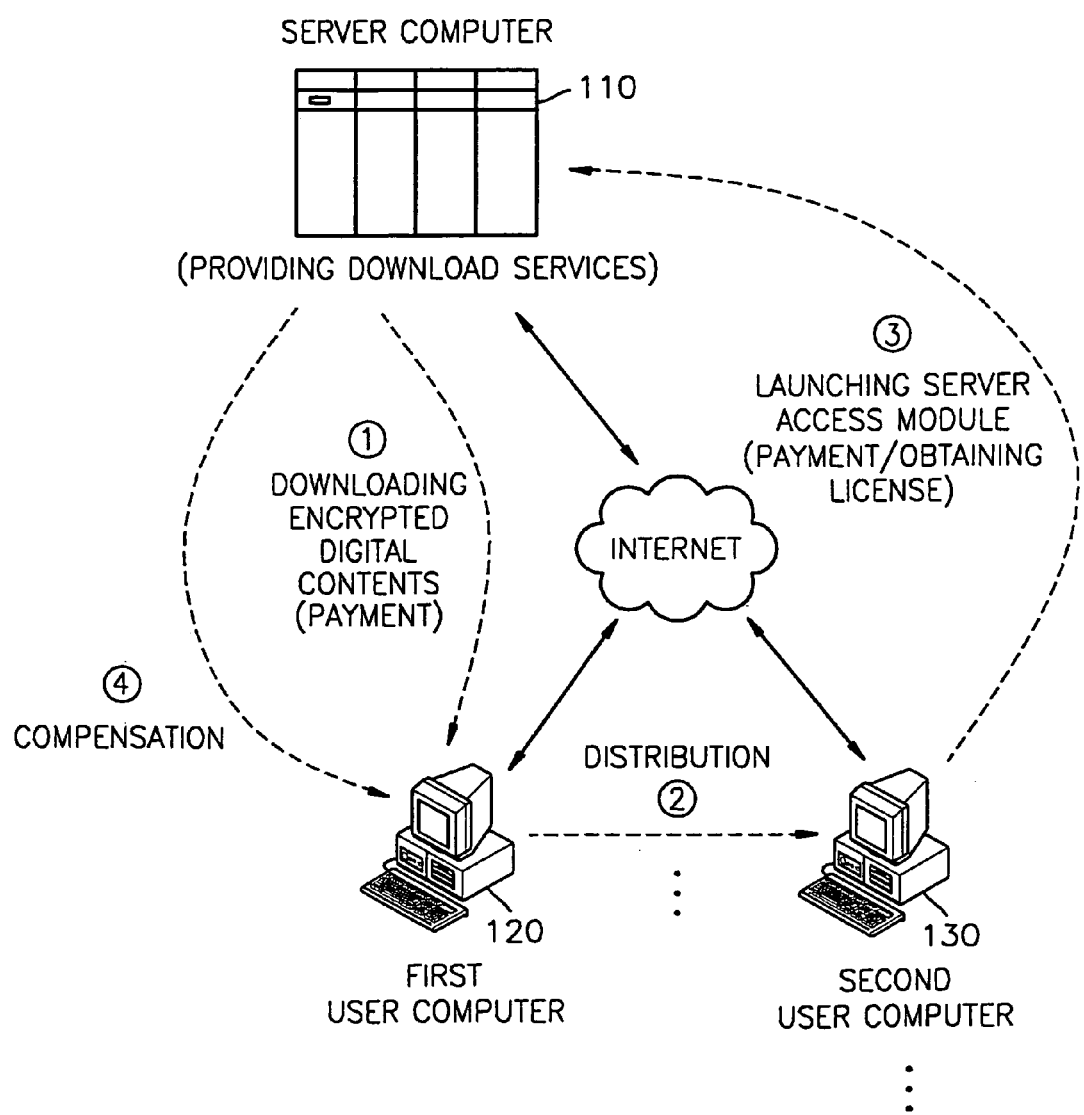
FIG. 1 illustrates the configuration of a digital contents superdistribution system according to an embodiment of the present invention.

Reference will now be made in detail to the present preferred embodiments of the present invention, examples of which are illustrated in the accompanying drawings, wherein like reference numerals refer to the like elements throughout. The embodiments are described below in order to explain the present invention by referring to the figures.

A system configuration according to an embodiment of the present invention will now be described with reference to FIG. 1.

As shown in FIG. 1, the system according to the embodiment of the invention includes a server computer 110, a first user computer 120, and a second user computer 130, all of which are connected to one another via a communication network (Internet). Hereinafter, the term computers 110, 120 and 130 can be interchangeably used with a user or manager of the computers.

The server computer 110 provides digital contents download services to users via a communication network and is equipped with a web server function for managing a website as a front-end responsible for a user interface. Furthermore, the server computer 110 is equipped with cryptography and payment systems, processes payment for digital contents download services, and provides digital contents on which a security code is set to the user who makes payment for digital contents. Of course, it will be understood by those of ordinary skill in the art that the server computer 110 does not need to be one computer physically, and that a web server function or payment (including security) function can be performed in separate computers. That is, the web server may be a cluster of computers acting as one entity, and all or some of which can be special purpose or general purpose computers.

The first user computer 120 performs payment for digital contents and is offered download services for encrypted digital contents from the server computer 110 (hereinafter referred to as "paid digital contents"). Here, a security code for the paid digital contents is set so as to operate normally at the first user computer 120, and the first user computer 120 can normally execute or reproduce the paid digital contents. This means that a security check for digital contents performed in the course of executing the digital contents is passed at the first user computer 120.

Furthermore, the first user computer 120 can freely distribute the paid digital contents to another user. In this case, digital contents that have not been paid for can be re-distributed, but only payers are compensated for the digital contents distribution, which will be described below. There may be various distribution methods, such as on-line download services, by e-mail, and off-line digital contents distribution.

If another user pays for the digital contents distributed through the first user computer 120 (if another user obtains a license to use them), the first user computer 120 which has distributed the corresponding digital contents is offered a predetermined compensation by the server computer 110. Here, payers to be compensated can be easily identified by a security code which is set on the corresponding digital contents.

The second user computer 130, which refers to a computer executing the digital contents distributed by the payer (i.e., the first user computer 120), executes corresponding distributed digital contents prior to making payment (i.e., executes unverified/unauthorized "digital contents"). In this case, a security check for a security code set on the digital contents fails, and the second user computer 120 is operated in a way to automatically connect with the server computer 110. This automatic connection function can be performed by a digital contents management module. Here, the digital contents management module refers to a program that performs a security check for a security code set on digital contents before executing or reproducing the digital contents.

If the second user computer 130 accesses the server computer 110 to perform payment for corresponding digital contents or to obtain a license for use, then the server computer 110 resets a security code which has been set on the corresponding digital contents so that the second user computer 130 can normally execute and reproduce the digital contents. In addition, a predetermined compensation is offered to the payer who distributed the corresponding digital contents.

As a payer who performs payment for the corresponding digital contents, the second user computer 130 can also distribute the digital contents on which a security code is set so as to also be a payer. If the digital contents, for which the second user computer 130 had paid, is subsequently paid for by another user, the second user computer 130 is given a predetermined compensation by the server computer 110. It is understood that it is also possible to share the predetermined compensation between all payers in the distribution hierarchy (i.e., compensating the first user computer 120 and the second user computer 130 after the second user computer 130 distributes the digital contents which are subsequently paid for by a third recipient).

The system configuration according to the embodiment of the present invention is based on the assumption that the user is connected to the server computer 110 via the Internet using a computer. However, the present invention can be applied in the same manner if the user is connected to the server computer 110 via a wireless Internet using a mobile communication terminal. In other words, the present invention can be applicable to various types of user terminals having a function of connecting to the server computer 110 via various types of communication networks.

Figure 2:
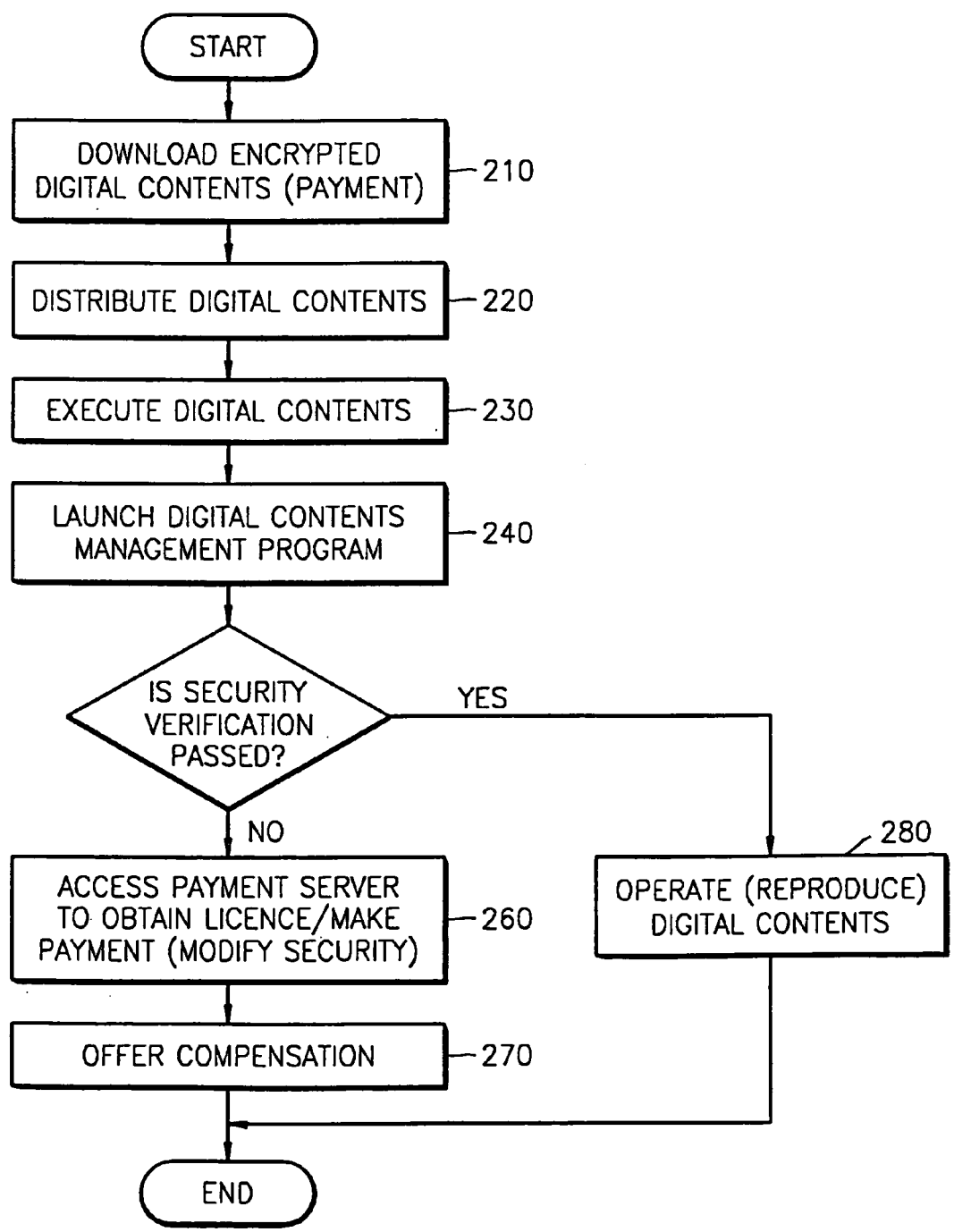
FIG. 2 is a flowchart showing a digital contents superdistribution method according to an embodiment of the present invention.

Referring to FIG. 2, which is a flowchart showing a digital contents superdistribution method according to an embodiment of the present invention, an operation method in the system configuration shown in FIG. 1 will now be described. First, the user accesses a server 110 which provides digital contents download services via a communication network to perform payment for desired digital contents and receive a download of the digital contents on which a security code is set (step 210). The payer is allowed to freely distribute the digital contents to another user (step 220).

Of course, it is understood that those other than the payer, such as those who do not make payment for the digital contents distributed by the payer, can re-distribute the corresponding digital contents, but only a payer can be compensated as described above. Further, it is understood that the digital contents can be distributed using traditional methods for distribution. For instance, it is understood that the digital contents can be mailed on recording media containing the digital content in addition to or instead of downloading the digital contents.

Once the digital contents are executed, a security code which is set on the corresponding digital contents is checked (steps 230 and 250). Here, as described above, the security check in the step 250 is generally performed by a digital contents management program (step 240). If the digital contents are executed on a payer's computer system (a user terminal in this case may include a mobile communication terminal, and hereinafter the same is true), a security check of the digital contents is passed, and then the digital contents are operated and reproduced normally (steps 250 and 280).

However, if the digital contents distributed from the payer are executed on a computer system, which is different from that identified through a security code set on the digital contents, a security check for a security code set on the corresponding digital contents fails. In this case, an automatic connection is made to a payment server of the digital contents (steps 250 and 260). The automatic server connection function may be performed by a digital contents management program.

If the user makes payment for the corresponding digital contents when being connected to the server through the step 260, then the server modifies the security code set on the corresponding digital contents so that the payer may execute or reproduce the digital contents normally. Finally, in step 270, if payment for the digital contents is made through the step 260, a predetermined compensation is offered to the payer who transmits the corresponding digital contents in the step 220. This is intended to give a payer an incentive for promoting digital contents distribution. The offering of payment may be in the form of checks or cash, electronic payments or credits to accounts, coupons to purchase goods or services, or other similar devices.

Although it is not shown in FIG. 2, the payer who makes payments through the step 260 can also transmit digital contents on which a security code is set for itself to be a payer, and if another user performs payment for the digital contents, a predetermined compensation is provided to the original payer. These processes can be hierarchically repeated.

Further, it is understood that compliance with a license can be accomplished in other than making payment, depending on the terms of the license. For instance, the compliance may be by granting permission to show advertisements on the payer's computer, the completion of marketing surveys by the payer, or any other agreement or action by the payer that is required by the terms of the license.

The digital contents superdistribution system and method according to the present invention allows those who properly receive downloads of digital contents to freely distribute the corresponding digital contents, while promoting distribution of digital contents by giving the distributors a predetermined portion of the profits. Furthermore, the superdistribution system and method according to the present invention can achieve compatibility with the conventional distribution mechanism for encrypted digital contents.

While this invention has been particularly shown and described with reference to a preferred embodiment thereof, it will be understood by those skilled in the art that various changes in form and details may be made therein without departing from the spirit and scope of the invention as defined by the appended claims. Therefore, the described embodiment should be considered not in terms of restriction but in terms of explanation. The scope of the present invention is limited not by the foregoing but by the following claims, and all differences within the range of equivalents thereof should be interpreted to be covered by the present invention.

What is claimed is:

1. A digital contents superdistribution method through digital contents download services, the superdistribution method comprising:

accessing by a first user a server providing digital contents download services via a first communication network to make payment for digital contents on the server, and receiving a download of the digital contents on which a security code is set;

after the first user makes the payment to the server, distributing the downloaded digital contents from the first user to a second user;

if the distributed digital contents are executed on the second user's computer, accessing the server automatically via the first or another communication network; and after the server is accessed and payment for the distributed digital contents is made by the second user, offering a predetermined compensation via the server to the first user who received the downloaded digital contents.

2. The method of claim 1, wherein, if the distributed digital contents are executed on the second user's computer, further accessing the server due to a failure of a security check on the security code set on the distributed digital contents.

3. The method of claim 1, wherein, if the server is accessed and payment for the distributed digital contents is made by the second user, further resetting the security code set on the distributed digital contents for the second user who made the payment.

4. The method of claim 3, further comprising:

further distributing the distributed digital contents on which the security code is reset to a third user;

if payment for the further distributed digital contents is made by the third user, offering via the server a predetermined compensation to the second user who further distributed the distributed digital contents, and if payment for the further distributed digital contents is made by the third user, the security code which has been set on the distributed digital contents is reset for the third user who made the payment.

5. The method of claim 1, further comprising further distributing the downloaded digital contents to additional users by the second user who received the distributed digital contents; and repeating said further distributing by the additional users to still other additional users hierarchically.

6. A digital contents superdistribution method through digital contents download services, the superdistribution method comprising:

downloading to a first client the digital contents on which a security code is set from a server, which provides digital contents download services and to which the first client both accessed via a communication network and made payment for the digital contents;

receiving at the server an access request from a second client via a second communication network if the downloaded digital contents are distributed from the first client to the second client and are executed on the second client; and offering via the server the first client a predetermined compensation if the second client makes payment for the distributed digital contents.

7. The method of claim 6, wherein the access request is automatically made owing to a failure of a security check on a security code set on the distributed digital contents which are executed on the second client.

8. The method of claim 6, wherein, if the second client makes payment for the distributed digital contents, resetting via the server the security code on the distributed digital contents for the second client.

9. The method of claim 8, further comprising offering via the server a predetermined compensation to the second client who has further distributed the digital contents on which the security code is reset to an additional client if the digital contents on which the security code is reset is distributed to additional clients and payment for the digital contents on which a security code is reset is made; and if payment for the digital contents on which the security code is reset is made, resetting the security code on the digital contents for the additional client who makes the payment.

10. A digital contents superdistribution system comprising:

a server computer to provide digital contents download services;

a first user computer connected to said server computer via a communication network, said first user computer makes payment for digital contents, and receives download services of the digital contents on which a security code is set from said server computer; and a second user computer that receives a copy of the digital contents of the first user computer, is connected to said server computer via a second communication network, and is automatically connected to said server computer if the copy of the digital contents distributed by said first user computer are executed by said second user computer, wherein, if the copy of the digital contents distributed by said first user computer are executed on said second user computer, said second user computer accesses said server computer due to a failure of a security check on the security code set on the copy of the digital contents, and if said second user computer accesses said server to make payment for the copy of the digital contents, a predetermined compensation is offered to a first user of said first user computer who has distributed the copy of the digital contents received by said second user computer.

11. The system of claim 10, wherein, if said second user computer makes payment for the copy of the digital contents, said server computer resets the security code on the copy of the digital contents of said second user computer.

12. A method of distributing digital contents using a server, comprising:

receiving at the server an indication from a receiving client through a communication network that the receiving client received a copy of digital contents from a distributing client, the distributing client having previously offered compensation for the digital contents using the server, with the indication including an identification of the distributing client and that the receiving client is compliant with a license for the digital contents; and offering compensation using the server to the distributing client after said receiving at the server the indication from the receiving client.

13. The method of claim 12, further comprising setting by the server the identification of the distributing client on the digital contents prior to said receiving the indication from the receiving client, said setting the identification comprising setting a distributing client security code for the digital contents; and resetting the distributing client security code for the copy of the digital contents to a receiving client security code using the server through the communication network if the receiving client is compliant with the license.

14. A method of distributing digital contents, comprising:
verifying at a server that a first client is compliant with a license for the digital contents through a first communication network prior to allowing the first client to access the digital contents;
receiving by a second client a copy of the verified digital contents of the first client;
verifying at the server that the second client is compliant with the license for the digital contents through the first or a second communications network prior to allowing the second client to access the copy of the verified digital contents of the first client; and
offering compensation to the first client if the second client is verified to be compliant with the license.

15. The method of claim 14, wherein
said verifying at the server that the first client is compliant comprises setting a first security code for the digital contents that allows the first client to access the digital contents, and
said verifying at the server that the second client is compliant comprises resetting the first security code for the copy of the verified digital contents of the first client to a second security code that allows the second client to access the digital contents.

16. The method of claim 15, wherein said verifying at the server that the second client is compliant further comprises receiving a payment from the second client prior to resetting the first security code to the second security code.

17. The method of claim 14, wherein said receiving by the second client comprises receiving the copy of the verified digital contents of the first client from the first client.

18. The method of claim 14, wherein said receiving by the second client comprises receiving the copy of the verified digital contents of the first client from a third client, where the third client was not compliant with the license.

19. A distributing system to manage the distribution of digital contents having a license, comprising:
a first client having the digital contents and the license, where said first client is verified to be compliant with the license;
a second client having a copy of the verified digital contents of said first client; and
a server that
verifies through a communication network whether said second client is compliant with the license for the digital contents, where said second client cannot access the copy of the verified digital contents of said first client unless said server verifies said second client is compliant with the license, and
offers compensation to said first client if said second client is verified to be compliant with the license.

20. The distributing system of claim 19, wherein said server further
sets a first security code for the digital contents that allows said first client to access the digital contents in order to verify that said first client is compliant with the license, and
resets the first security code for the copy of the verified digital contents of said first client to a second security code that allows said second client to access the digital contents in order to verify that said second client is compliant with the license.

21. The method of claim 4, further comprising repeating said further distributing and offering the predetermined compensation hierarchically.

22. The method of claim 9, further comprising repeating hierarchically said further distributing by and offering the predetermined compensation to the additional client to additionally distribute the digital contents to still other additional clients.

* * * * *